US012724654B2

(12) United States Patent
Mutalik et al.

(10) Patent No.: US 12,724,654 B2
(45) Date of Patent: Sep. 1, 2026

(54) SYSTEM AND METHOD TO ENHANCE LAUNCHING OF APPLICATION AT A USER EQUIPMENT

(71) Applicant: Samsung Electronics Co., Ltd., Suwon-si (KR)

(72) Inventors: Sripurna Mutalik, Bengaluru (IN); Manith Shetty, Bengaluru (IN); Anuradha Kanukotla, Bengaluru (IN); Mayank Gupta, Bengaluru (IN); Sumeen Agrawal, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 505 days.

(21) Appl. No.: 18/334,997

(22) Filed: Jun. 14, 2023

(65) Prior Publication Data

US 2023/0385134 A1 Nov. 30, 2023

Related U.S. Application Data

(63) Continuation of application No. PCT/KR2023/006914, filed on May 22, 2023.

(30) Foreign Application Priority Data

May 27, 2022 (IN) ............................. 202241030555
Dec. 22, 2022 (IN) ............................. 202241030555

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02)

(58) Field of Classification Search
CPC ................................. G06F 9/542; G06F 9/451
(Continued)

(56) References Cited

U.S. PATENT DOCUMENTS

2005/0091611 A1 4/2005 Colleran et al.
2007/0083813 A1* 4/2007 Lui .................... G06F 11/3612 709/224

(Continued)

FOREIGN PATENT DOCUMENTS

CN 107273130 A 10/2017
CN 109343903 A 2/2019

(Continued)

OTHER PUBLICATIONS

Launch Time Tips, retrieved on May 16, 2022, https://developer.apple.com/library/archive/documentation/Performance/Conceptual/LaunchTime/Articles/LaunchTips.html#//apple_ref/doc/uid/20001855-BCIHAGAJ, 3 pages.

(Continued)

*Primary Examiner* — Tuan C Dao
(74) *Attorney, Agent, or Firm* — Nixon & Vanderhye P.C.

(57) ABSTRACT

An artificial intelligence (AI) based method to enhance launching of an application at a user equipment (UE) is provided. The method includes monitoring launch of the application on the UE. The method includes determining an event to be executed upon the launch of the application. The method includes categorizing the event into one of a UI updating event and a non-UI updating event. Further, generating an execution flow based on the categorization, wherein the execution flow is indicative of prioritizing the UI updating event for execution before the non-UI updating event such that prioritization prevents a mismatch of the UI components during the launch. The method includes storing the execution flow and executing the stored execution flow (Continued)

during a subsequent launch of the application, such that launching of the at application is enhanced.

14 Claims, 7 Drawing Sheets

(58) Field of Classification Search
USPC ........................................................ 719/318
See application file for complete search history.

(56) References Cited

U.S. PATENT DOCUMENTS

2007/0236472 A1* 10/2007 Bentsen ................ G06F 3/0445 345/173
2011/0066982 A1* 3/2011 Paulsami .............. G06F 16/955 715/835
2011/0106736 A1* 5/2011 Aharonson ....... H04M 1/72472 706/46
2012/0278722 A1 11/2012 Raleigh et al.
2012/0324359 A1* 12/2012 Lee ..................... G06F 11/3438 715/733
2013/0226837 A1* 8/2013 Lymberopoulos .......................... G06F 16/9574 706/12
2014/0089857 A1 3/2014 Wang et al.
2014/0143791 A1* 5/2014 Mark ...................... G06F 9/485 719/318
2015/0046909 A1 2/2015 Ligman et al.
2015/0249716 A1* 9/2015 Chen ..................... H04L 67/535 709/224
2015/0293954 A1* 10/2015 Hsiao ...................... G06F 16/22 715/738
2016/0034139 A1 2/2016 Boneti et al.
2016/0062635 A1* 3/2016 Feit ......................... G06F 9/485 715/765
2018/0217720 A1* 8/2018 Perez .................... G06F 3/0482
2019/0377818 A1* 12/2019 Andritsos ........... G06F 16/2465
2020/0110457 A1 4/2020 Mak-Fan et al.
2021/0216335 A1 7/2021 Kanukotla et al.
2021/0233118 A1 7/2021 Gratz et al.
2021/0334375 A1* 10/2021 Hu ........................ G06F 21/567
2022/0398140 A1* 12/2022 Singh ........................ G06F 9/54
2023/0035310 A1* 2/2023 Denneman ............. G06N 3/084

FOREIGN PATENT DOCUMENTS

CN 109814952 A 5/2019
CN 110597512 A 12/2019
WO 2021036735 A1 3/2021

OTHER PUBLICATIONS

Immediately update UI from non UI thread in android, retrieved on May 16, 2022, https://stackoverflow.com/questions/23473331/immediately-update-ui-from-non-ui-thread-in-android, 3 pages.
PCT International Search Report dated Sep. 12, 2023 for PCT/KR2023/006914.
PCT Written Opinion dated Sep. 12, 2023 for PCT/KR2023/006914.
India Examination Report dated Apr. 8, 2025 for IN Application No. 202241030555.

* cited by examiner

100

SYSTEM AND METHOD TO ENHANCE LAUNCHING OF APPLICATION AT A USER EQUIPMENT

CROSS REFERENCE TO RELATED APPLICATION

This application is a continuation of International Application PCT/KR2023/006914, filed May 22, 2023, which is based on and claims priority on IN Patent Application No. 202241030555 (Provisional Specification) filed on May 27, 2022, and IN Patent Application No. 202241030555 (Complete Specification) filed on Dec. 22, 2022, the disclosures of which are all hereby incorporated herein by reference in their entireties.

BACKGROUND

Field

Certain example embodiment(s) generally relates to rendering user interface on a user equipment and for example to system and/or method for enhancing user interface rendering on the user equipment.

Description of Related Art

Currently, an application installed in a user device may possess interactive user interface (UI) for providing enriching experience to a user while interacting with the application. The UI may include several user interface elements for instance icons, windows, and control buttons. The control buttons may include but not limited to visual interface elements such as pictures, buttons, menus, tabs, text boxes, dialog boxes, status bars, navigation bars, and widgets. The attributes and contents of the user interface elements in the UI may be defined by tags or nodes. For instance, an Extensible Markup Language (XML) specifies the user interface elements contained in the UI via a View object described by the node. A node in the XML file describes a view object. The View object is obtained after the XML file is parsed. The user device may draw the View object as the user interface element to be displayed through the UI drawing process. Finally, the user interface elements to be displayed are rendered on a screen of the UI.

Thus, UI rendering is the act of generating a frame from the application e.g., blocking out an area on the screen for presenting View object and displaying it on the screen of the user device. To ensure that the user's interaction with the application is smooth, the application should render the frames in shortest time. If the application suffers from slow UI rendering, then the system is forced to skip frames and the user may perceive stuttering in the application launch commonly known as jank. Therefore, the speed of UI rendering affects the efficiency of the user device presenting UI to the user.

SUMMARY

Therefore, there is a need to improve user experience by improving the speed or rendering of UI or the interface drawing in the user device such that launching of the application is enhanced and does not encounter stuttering.

This summary is provided to introduce a selection of concepts, in a simplified format, that are further described in the detailed description. This summary is neither intended to identify key or essential inventive concepts nor is it intended for determining the scope.

According to an example embodiment, an artificial intelligence (AI) based method to enhance launching of at least one application at a user equipment (UE) is disclosed. The method may include monitoring a launch of the at least one application on the UE; wherein the launch may include loading a plurality of user interface (UI) components on a user interface (UI) of the UE. The method may include determining a plurality of events to be executed upon the launch of the at least one application. The method may include categorizing each of the plurality of events into one of at least one UI updating event and at least one non-UI updating event for the at least one application. The method may include generating an execution flow based on the categorization, wherein the execution flow is indicative of prioritizing the at least one UI updating event for execution before the at least one non-UI updating event such that prioritization prevents a mismatch of the plurality of UI components during the launch. The method may include storing the execution flow. The method may include executing the stored execution flow during a subsequent launch of the at least one application, such that launching of the at least one application is enhanced.

According to an example embodiment, an artificial intelligence (AI) based system may be provided, to enhance launching of at least one application at a user equipment (UE). The system may include a launching module configured to monitor a launch of the at least one application on the UE; wherein the launch comprises loading a plurality of user interface (UI) components on a user interface (UI) of the UE and determine a plurality of events to be executed upon the launch of the at least one application. The system may include a categorization module configured to categorize each of the plurality of events into one of at least one UI updating event and at least one non-UI updating event for the at least one application and generate an execution flow based on the categorization, wherein the execution flow is indicative of prioritizing the at least one UI updating event for execution before the at least one non-UI updating event such that prioritization prevents a mismatch of the plurality of UI components during the launch and store the execution flow. The system may include an executing module configured to execute the stored execution flow during a subsequent launch of the at least one application, such that launching of the at least one application is enhanced.

To further clarify the advantages and features of certain example embodiment(s), a more particular description will be rendered by reference to certain example embodiments thereof, which are illustrated in the appended drawings. It is appreciated that these drawings depict only example embodiments and are therefore not to be considered limiting of its scope.

BRIEF DESCRIPTION OF DRAWINGS

These and other features, aspects, and advantages of certain example embodiment(s) will become better understood when the following detailed description is read with reference to the accompanying drawings in which like characters represent like parts throughout the drawings, wherein.

Figure 1:
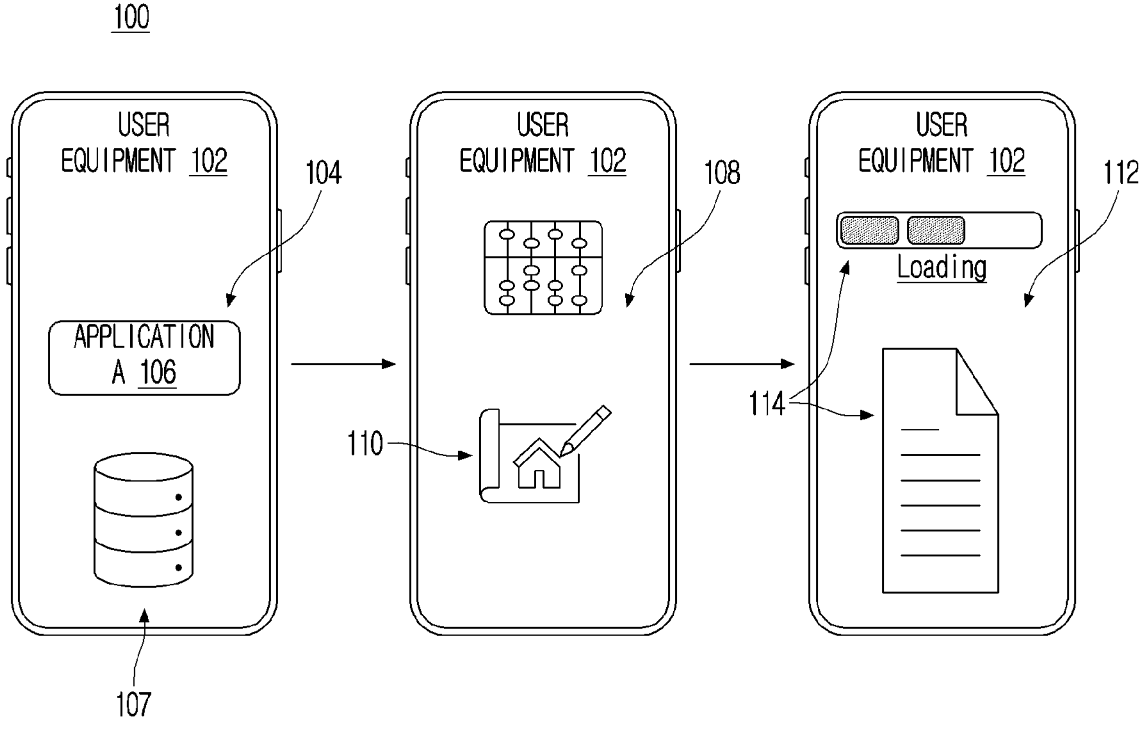
FIG. 1 illustrates a schematic block diagram depicting an environment for the implementation of a system to enhance launching of an application at a user equipment (UE), according to an embodiment of certain example embodiment (s)

Further, skilled artisans will appreciate that elements in the drawings are illustrated for simplicity and may not have necessarily been drawn to scale. For example, the flow charts illustrate the method in terms of the most prominent steps involved to help to improve understanding of aspects of certain example embodiment(s). Furthermore, in terms of the construction of the device, one or more components of the device may have been represented in the drawings by conventional symbols, and the drawings may show only those specific details that are pertinent to understanding the embodiments of certain example embodiment(s) so as not to obscure the drawings with details that will be readily apparent to those of ordinary skill in the art having the benefit of the description herein.

DETAILED DESCRIPTION

For the purpose of promoting an understanding of the principles, reference will now be made to the various example embodiments and specific language will be used to describe the same. It will nevertheless be understood that no limitation of the scope is thereby intended, such alterations and further modifications in the illustrated system, and such further applications of the principles illustrated therein being contemplated as would normally occur to one skilled in the art.

It will be understood by those skilled in the art that the foregoing general description and the following detailed description are explanatory of example embodiments and are not intended to be restrictive thereof.

Reference throughout this specification to "an aspect," "another aspect" or similar language indicates that a particular feature, structure, or characteristic described in connection with the embodiment is included in at least an example embodiment of certain example embodiment(s). Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1 illustrates a schematic block diagram depicting an environment for the implementation of a system 100 to enhance launching of an application 106 at a user equipment (UE) 102, according to an embodiment of certain example embodiment(s). For the sake of brevity, the system 100 to enhance launching of the application 106 at the UE 102 is hereinafter interchangeably referred to as the system 100.

In an embodiment, referring to FIG. 1, the system 100 may be implemented in the UE 102, the application 106 installed in the UE 102 and running on an operating system (OS) of the UE 102 that generally defines a first active user environment. The OS typically presents or displays the application 106 through a graphical user interface ("GUI") of the OS. Other applications may be running on the operating system of the UE 102 but may not be actively displayed. In an example, the UE 102 may be but not limited to, a laptop computer, a desktop computer, a Personal Computer (PC), a notebook, a smartphone, a tablet, a smart watch and alike. In the example, the operating system in the UE 102 may be an android operating system.

In some embodiments, a user may interact with the UE 102 by selecting the application 106. In some example, the UE 102 may be a touch-screen device capable of receiving touch input from the user. Thus, the UE 102 receives the user touch input on the screen for launching the application 106. As seen in the screen 104, the UE 102 displays the application 106 may be in form of an icon. Thus, the icon indicating to the user to click on the application 106 for a launch.

Further, as seen in the screen 108, the launching of the application 106 may include drawing of a frame on the screen 108 of the UE 102. The drawing of the frame may be indicative of blocking out an area on the screen 108 to display user interface (UI) components on a user interface (UI) e.g., the screen 108 of the UE 102.

In some embodiment, the system 100 comprises scheduling the drawing of the visual/user interface component immediately after the application 106 has been launched. In an example, the application's 106 user interface in the android environment may be made up of a series of View and ViewGroup elements. The application 106 may have one or more operations, each of which is a single screen of the application 106. There may multiple UI components present in the operations, and such UI components may be instances of a View and a ViewGroup subclasses. The view is a basic building block of UI in the UE 102 with android as OS. The view is indicative of an element that may respond to the user inputs. For instance, an EditText, a Button, a CheckBox, etc. The ViewGroup is indicative of a collection of Views. As the name states View is singular and the group of Views is the ViewGroup. In simple terms, the view is the UI component that the user interacts with while using the application 106, such as a button, an editing text, and an image. Further, with every interaction or input of the user to the UE 102, the UI component on the UI of UE 102 for the application 106 may change. Thus, the user may interact with the application 106 and perform the intended purpose of the application 106. For example, if the user intends to launch the application 106 which may provide user experience of a wordpad, then the user may click on the icon of the application 106. Upon launch of the application 106, the application 106 may render a splash screen. The splash screen is the first screen visible to the user when the application 106 is launched. The Splash screen is one of the most vital screens in the application 106 since it's the user's first experience with the application 106.

As seen in the screen 108, the splash screen appears on the UE 102. Thus, the events are rendered on the screen 108. The events may be indicative of UI components. Such events must be executed to complete the launch of the application 106.

In some embodiments, the events may be of two types, that is UI updating events and non-UI updating events. In an example, the UI updating events may be indicative of events capable of alterations in property of the UI components. Such as change in background colour (color) of the application 106, change in orientation of any button in the application 106. In another example, the non-UI updating event may be indicative of events wherein property of the UI components may not be altered and remains same. Such as library loading function, database or file access, network access. Further, the system 100 includes determining the events to be executed upon the launch of the application 106 and categorizing the events as UI updating events 110. As seen in screen 108, the splash screen upon launch of the application 106 presents the UI updating events 110. Such UI updating events 110 may be animations, images representing said application 106. Thus, the system 100 generates an execution flow representative of a launch sequence of the application 106 based on the categorization. The execution flow may be indicative of prioritizing the UI updating event 110 for execution before the non-UI updating event. Therefore, the screen 108 shows UI events 110.

In some embodiments, as the system 100 includes determining the events to be executed upon the launch of the application 106 and categorizing the event as UI updating event 110 and non-UI updating event. The system 100 executes the non-UI updating events after the UI updating event 110 are rendered on the screen. As seen in the screen 112, the non-UI updating event 114 such as document upload, network uploading status are rendered on the screen 112.

Thus, the system 100 generates the execution flow. In the execution flow the UI updating event 110 is prioritized for execution before execution of the non-UI updating event 114. This technique may reduce the stuttering in the launch and instead enhance launching of the application 106.

In some embodiments, the system 100 includes a database 107. In an example, the database 107 may reside in UE 102 or may reside as a cloud database. The system 100 upon determining the event to be executed upon the launch of the application 106 and thereafter categorizing the event as the UI updating event 110 and the non-UI updating event 114, may store the categorization in the database 107. In the example, the system 100 may store the generated execution flow which comprises of priority order of the UI updating event 110 and the non-UI updating event 114. Thus, during a subsequent launch of the application 106, the system 100 may query the database 107 for the stored execution flow for the application 106. The system 100 upon receiving the stored execution flow executes the same. Thus, preventing mismatch of the UI components during the launch of the application 106.

Further, the application 106 may be used for receiving instructions from the user and launching the application 106 using a module of the system 100.

Figure 2:
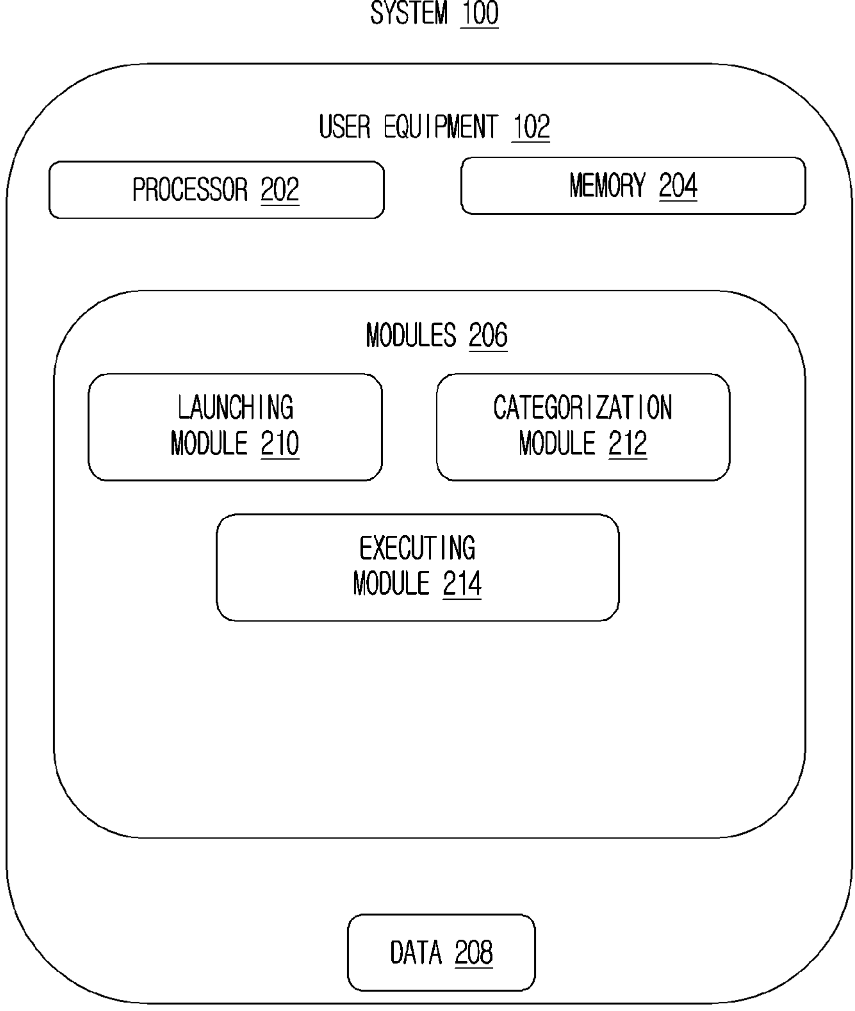
FIG. 2 illustrates a schematic block diagram of modules/software components of the system to enhance launching of the application at the UE, according to an embodiment of certain example embodiment(s)

FIG. 2 illustrates a schematic block diagram of modules/software components of the system to enhance launching of the application at the UE, according to an embodiment of certain example embodiment(s).

The UE 102 may include, but is not limited to, a processor 202, memory 204, modules 206, and data 208. The modules 206 and the memory 204 may be coupled, directly or indirectly, to the processor 202, or may be in/used by the processor.

The processor 202, comprising processing circuitry, can be a single processing unit or several units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is adapted to fetch and execute computer-readable instructions and data stored in the memory 204.

The memory 204 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The modules 206, amongst other things, include routines, programs, objects, components, data structures, etc., which perform particular tasks or implement data types. The modules 206 may also be implemented as, signal processor(s), state machine(s), logic circuitries, and/or any other device or component that manipulates signals based on operational instructions. Thus, each module may comprise circuitry, such as processing circuitry and/or logic circuitry.

Further, the modules 206 can be implemented in hardware, instructions executed by a processing unit, or by a combination thereof. The processing unit can comprise a computer, a processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment, the modules 206 may be machine-readable instructions (software) which, when executed by a processor/processing unit, perform any of the described functionalities.

In an embodiment, the modules 206 may include a launching module 210 (comprising circuitry), a categorization module 212 (comprising circuitry), and an executing module 214 (comprising circuitry). The launching module 210, the categorization module 212, and the executing module 214 may be in communication with each other. The data 208 serves, amongst other things, as a repository for storing data processed, received, and generated by one or more of the modules 206. Modules 210, 212, and 214 may all be in/used by a given processor, or may be in/used by different processors. Each "module" herein may comprise circuitry, such as processing circuitry.

Referring to FIG. 1 and FIG. 2, in an embodiment, the launching module 210 may be configured to monitor the launch of the application 106 on the UE 102. The launch may include loading the UI components on the UI of the UE 102. Further, the launching module 210 is configured to determine the events to be executed upon the launch of the application 106. The launching module 210 is in communication with the categorization module 212.

In an embodiment, the categorization module 212 may be configured to categorize the events into the UI updating event 110 and the non-UI updating event 114 for the application 106. Further, the categorization module 212 is configured to generate the execution flow based on the categorization. In an example, the execution flow is indicative of prioritizing the UI updating event 110 for execution before the non-UI updating event 114 such that prioritization prevents the mismatch of the UI components during the launch of the application 106. In an example, the categorization module 212 is configured to store said generated execution flow in the database 107.

In another embodiment, the categorization module 212 may include an artificial intelligence (AI) based training model. The training model may be trained for categorizing the events as the UI updating event 110 and the non-UI updating event 114 for the application 106 and may store the categorization. In an example, the AI based training model may be trained during first ten (10) launches of the application to categorize the event into UI updating event 110 and the non-UI updating event 114. The trained model may then store the categorization in the database 107 for subsequent launch of the application 106. The launching module 210 and the categorization module 212 is in communication with the executing module 214.

In an embodiment, the executing module 214 may be configured to execute the stored execution flow during the subsequent launch of the application 106. Now as the UI updating event 110 is prioritized for execution before the non-UI updating event, this may enhance the launch of the application 106.

Figure 3A:
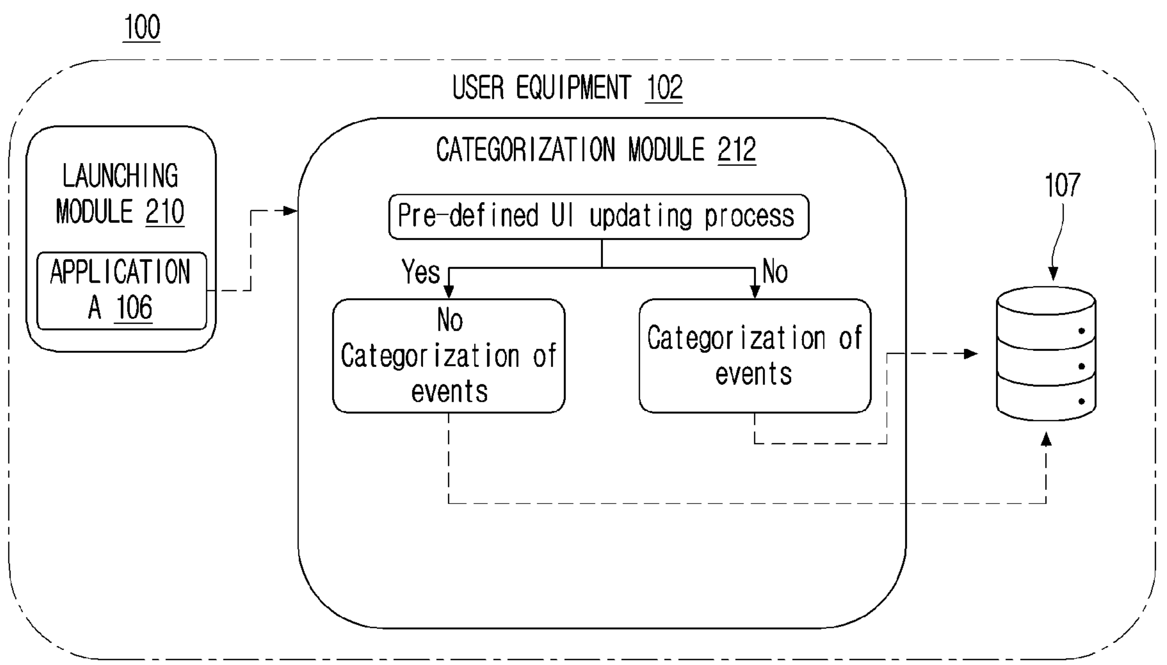
FIG. 3*a* illustrates a block diagram associated with a categorization module of the system, in accordance with various example embodiments.

FIG. 3*a* illustrates a block diagram associated with the categorization module 212 of the system 100, in accordance with various embodiments.

In an embodiment, the launching module 210 upon receiving the user input to launch of the application 106 may determine the events to be executed. The launching module 210 communicates the events to the categorization module 212. As seen in FIG. 3*a*, the categorization module 212 may be configured to determine if there is a pre-defined UI updating process corresponding to the application 106 to be launched. In an example, the categorization module 212 upon determining that the pre-defined UI updating process exists for the application 106, the categorization module 212 terminates the categorization of the events into the UI updating event 110 and the non-UI updating event 114. In the example, the application 106 may include the pre-defined UI updating process wherein scheduling/prioritization of the UI components is defined. Thus, to prevent or reduce a chance of mismatch of the UI components, the categorization module 212 terminates the categorization of the events into the UI updating event 110 and the non-UI updating event 114 and the pre-defined UI updating process is rather considered for further steps.

In another example, the categorization module 212 upon determining absence of the pre-defined UI updating process, may proceed towards categorization of events into the UI updating event 110 and the non-UI updating event 114.

Figure 3B:
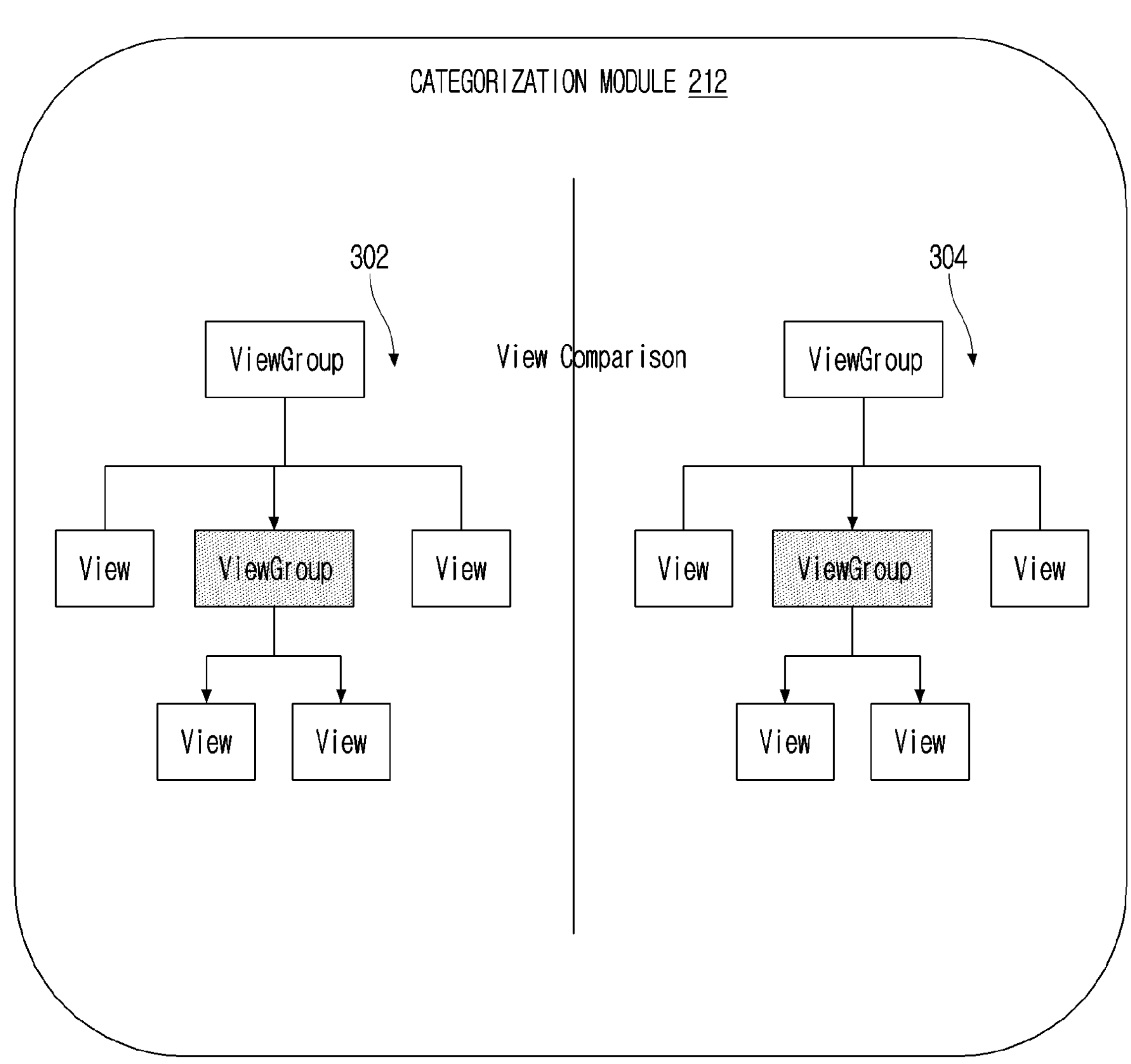
FIG. 3*b* illustrates an exemplary block diagram associated with the categorization module of the system, in accordance with various example embodiments.

FIG. 3*b* illustrates an exemplary block diagram associated with the categorization module 212 of the system 100, in accordance with various embodiments. The categorization module 212 may be configured to categorize the events into the UI updating event 110 and the non-UI updating event 114 of FIG. 1.

In an embodiment, the categorization module 212 may be configured to capture a UI view hierarchy 302 at the launch of the application 106 at the UE 102 (e.g., see FIG. 1). Such UI view hierarchy 302 may be a reference for later purpose. In an example, the UI view hierarchy 302 may include a hierarchy of a view and view-groups node at a first instance e.g., at the launch of the application 106. In the example, the view may indicate a Graphical User Interface (GUI) element for performing the event when the user interacts with the UI of the application 106. Further as the application 106 is executed e.g., a source-code is executed to run the application 106 for its intended purpose, the categorization module 212 is configured to capture a current UI view hierarchy 304 during execution of the application 106 at the UE 102. The current UI view hierarchy 304 is compared with the reference UI view hierarchy 302. In an example, the current UI view hierarchy 304 may include a hierarchy of the plurality of views and view-groups nodes at a second instance e.g., during execution of the application 106.

Further, the categorization module 212 may be configured to compare the UI view hierarchy 302 of the first instance and the current UI view hierarchy 304 of the second instance. In an example, the categorization module 212 is configured to compare the UI view hierarchy 304 with the current UI view hierarchy 304 for determining if the current UI view hierarchy 304 differs or is similar to the UI view hierarchy 302. In an example, the categorization module 212 is configured to categorize the event as UI updating event 110 upon comparison that the UI view hierarchy 302 differs from the current UI view hierarchy 304. In another example, the categorization module 212 is configured to categorize the event as the non-UI updating event 114 upon comparison that the UI view hierarchy 302 is similar to the current UI view hierarchy 304.

Further, as part of comparing the UI view hierarchy 302 of the first instance and the current UI view hierarchy 304 of the second instance, the categorization module 212 is configured to compare the view 302*a* (e.g., see FIG. 3C) present in the UI view hierarchy 302 with the view 304*a* (e.g., see FIG. 3C) present in the current UI view hierarchy 304. Now, for comparing the view 302*a* and view 304*a* the categorization module 212 is configured to identify a change in the pre-defined property of the view 302*a* and view 304*a*.

In an example, the categorization module 212 may be configured to categorize the event as the UI updating event 110 in response to identifying difference in the pre-defined property.

In another example, the categorization module 212 may be configured to categorize the event as the non-UI updating event 114 in response to not identifying the difference in the pre-defined property.

Figure 3C:
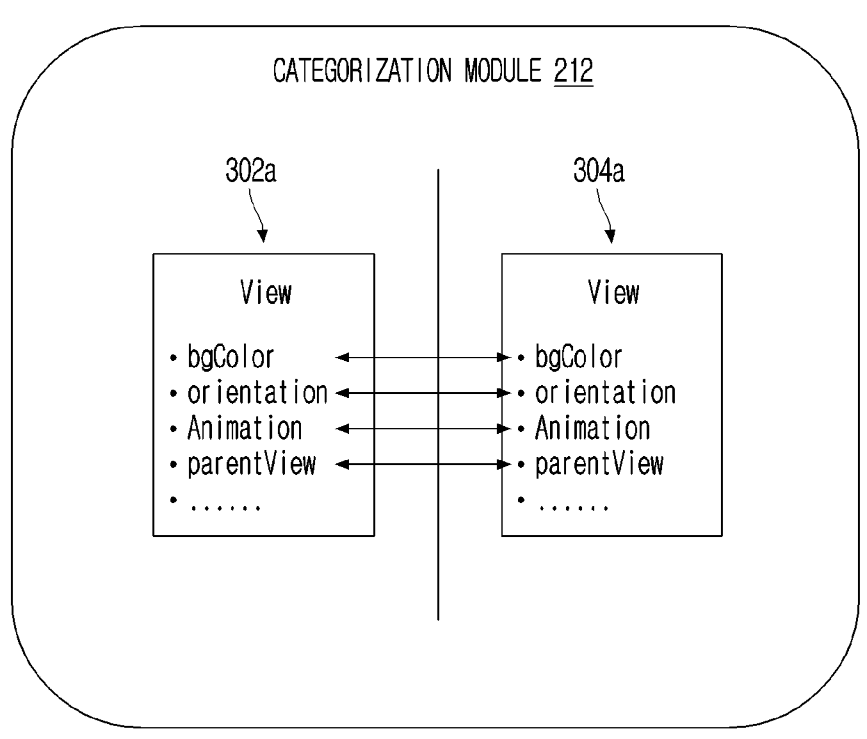
FIG. 3*c* illustrates an exemplary block diagram associated with the categorization module of the system, in accordance with various example embodiments.

FIG. 3*c* illustrates an exemplary block diagram associated with the categorization module 212 of the system 100, in accordance with various embodiments. As seen in FIG. 3*c*, the predefined properties such as background colour, orientation, animation, and parentview for the view 302*a* of the UI view hierarchy 302 is compared with the view 304*a* of the current UI view hierarchy 304.

Further, the categorization module 212 based on the categorization of the event, may be configured to generate the execution flow. The execution flow is the launch sequence of the application 106. In an example, the UE 102 with android as OS may include the launch sequence of the application 106, in accordance to which the application 106 may render the UI updating event 110 and the non-UI updating event 114. Thus, the execution flow may include prioritization order of the UI updating event 110 for execution before the non-UI updating event 114. The categorization module 212 may be configured to store the execution flow in the database 107.

Figure 4:
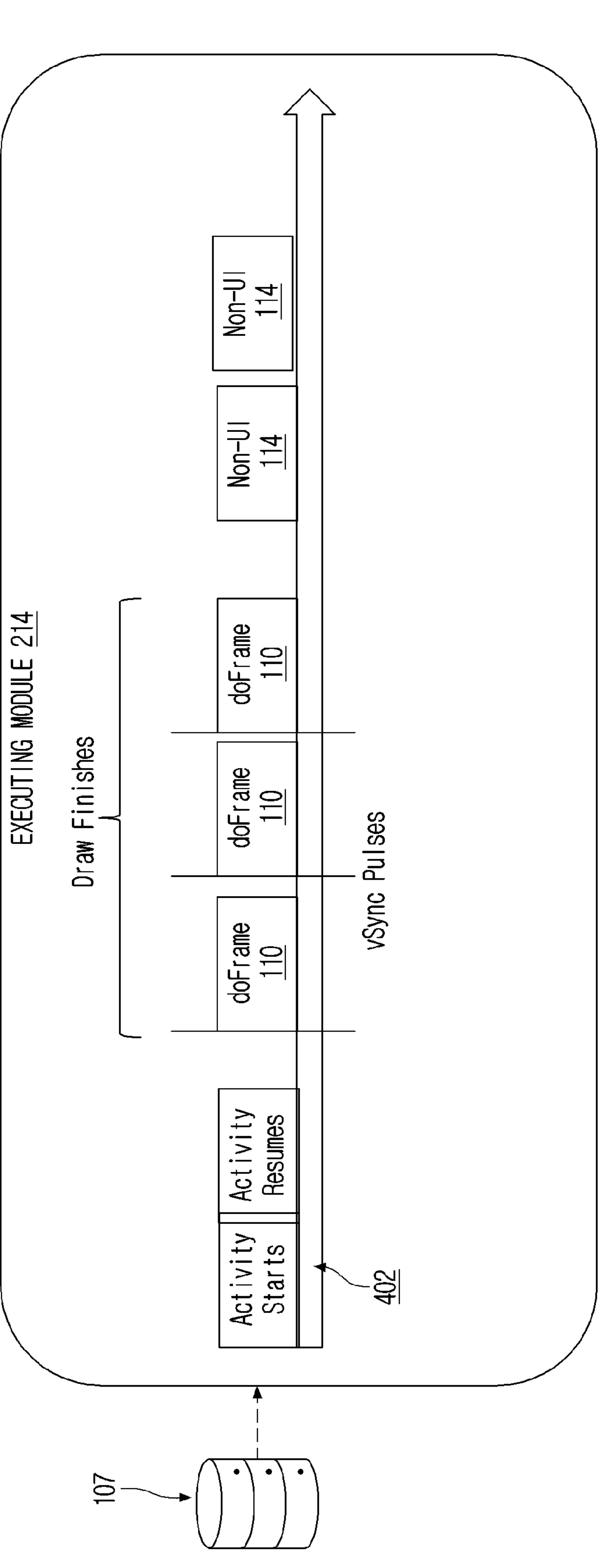
FIG. 4 illustrates an exemplary block diagram associated with an executing module of the system, in accordance with various example embodiments.

FIG. 4 illustrates an exemplary block diagram associated with the executing module 214 of the system 100, in accordance with various embodiments.

In an embodiment, the executing module 214 may be configured to execute the group of the UI updating event 110 before the group of the non-UI updating event in accordance with the stored execution flow for the application 106. In an example, executing the group of the UI updating event 110 may be indicative of rendering the UI updating event 110 on the UI of the UE 102 upon launch of the application 106. The executing module 214 may query the database 107 for providing the stored execution flow 402 corresponding to the application 106.

In some embodiments, as seen in FIG. 4, the database 107 provides the stored execution flow 402. In the execution flow 402, the UI updating event 110 are arranged in the launch sequence before the non-UI updating event 114. In an example, the executing module 214 may be configured to determine a group of the UI updating event 110 in the execution flow 402 upon categorization. Further in the example, the executing module 214 may be configured to determine a group of the non-UI updating event 114 in the execution flow 402 and execute the group of the UI updating event 110 before the group of the non-UI updating event 114.

Thus, as seen in FIG. 4, the UI updating event 110 are drawn on the UI of the UE 102. As the draw for the UI updating event 110 finishes, thereafter the non-UI updating event 114 are arranged for execution. Such execution flow 402 enhances the launch of the application 106 at the UI of the UE 102. Thus, the user while interacting with the application 106 may view the UI updating event 110 before the non-UI updating event 114.

In another embodiment, the executing module 214 is configured to identify presence of the non-UI updating event 114 in the group of the UI updating event 110. Upon identifying presence of the non-UI updating event 114 in the group of the UI updating event 110, the executing module 214 is configured to discontinue execution of the group of the UI updating event 110, such that a visual mismatch is prevented or reduced during the launch of the application 106. Thus, working as a feedback mechanism for the categorization module 212. Thereafter, the categorization module 212 after receiving the communication from the executing module 214 re-categorize the event into one of the UI updating event 110 and the non-UI updating event 114.

Figure 5:
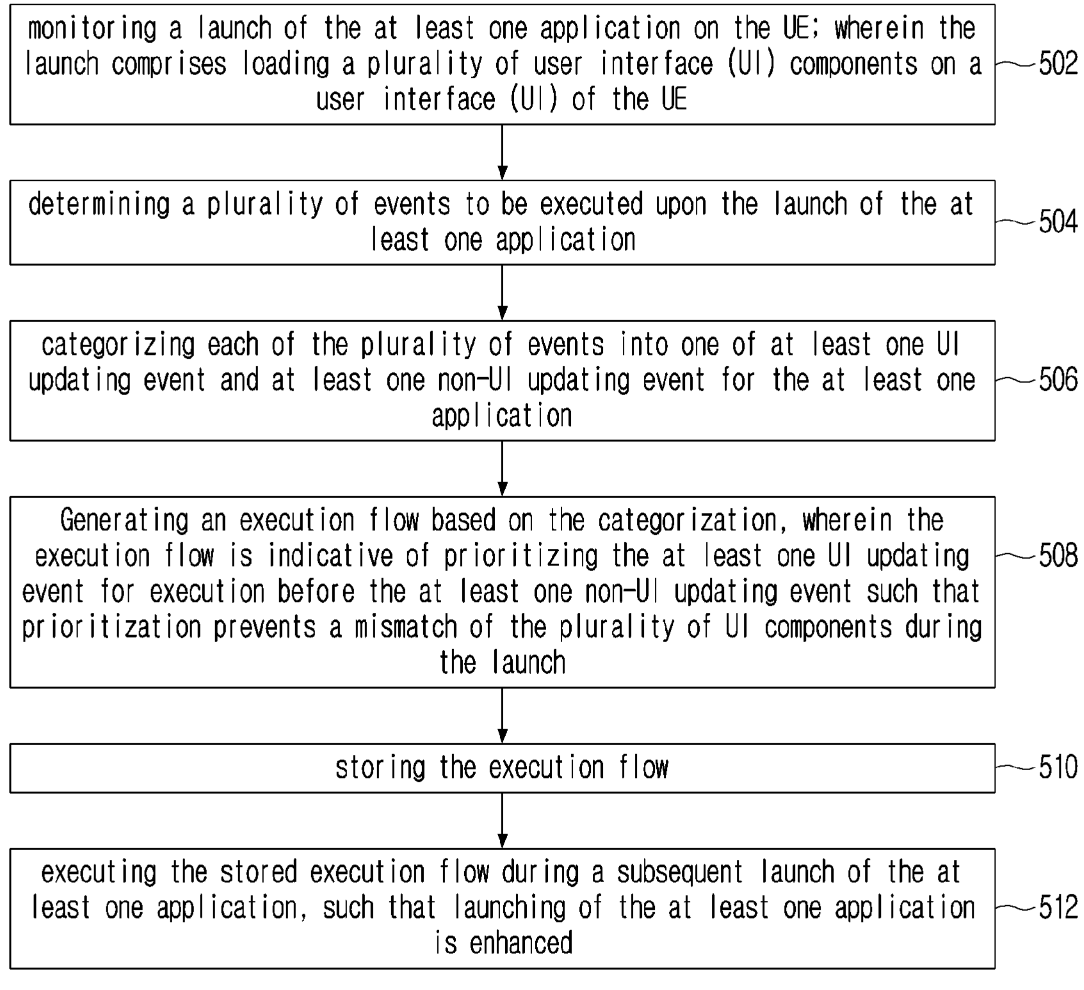
FIG. 5 illustrates an exemplary process flow comprising a method to enhance launching of an application at a user equipment (UE), according to an example embodiment.

FIG. 5 illustrates an exemplary process flow comprising a method 500 to enhance launching of the application 106 at the UE 102, according to an embodiment of certain example embodiment(s). The method 500 may be a computer-implemented method executed, for example, by the UE 102 and the modules 206.

For the sake of brevity, constructional and operational features of the system 100 that are already explained in the description of FIG. 1, FIG. 2, FIG. 3*a*, FIG. 3*b*, FIG. 3*c* and FIG. 4 are not explained in detail in the description of FIG. 5.

At step 502, the method 500 may include monitoring the launch of the application 106 on the UE 102. The launch may include loading the UI components on the UI of the UE 102.

At step 504, the method 500 may include determining the events to be executed upon the launch of the application 106.

At step 506, the method 500 may include categorizing the event into the UI updating event 110 and the non-UI updating event 114 for the application 106. In the method 500, categorizing the event into one of the UI updating event 110 and the non-UI updating event 114 may be determined considering absence of the pre-defined UI updating process for the application 106.

The method 500 may include, capturing the UI view hierarchy 302 at the launch of the application 106 at the UE 102. The UI view hierarchy 302 includes a hierarchy of the view and view-group node. The view indicates the GUI elements for performing the events when the user interacts with the UI of the application 106. Further, the method 500 may include capturing the current UI view hierarchy 304 at the execution of the application 106 at the UE 102. In the method 500 includes comparing the UI view hierarchy 304 with the current UI view hierarchy 304 and categorizing the events as the UI updating event 110 upon comparison that the UI view hierarchy 302 differs from the current UI view hierarchy 304. The method 500 includes categorizing the event as the non-UI updating event 114 upon comparison that the UI view hierarchy 302 is similar to the current UI view hierarchy 304.

The method 500 may include, comparing the view 302*a* present in the UI view hierarchy 302 with the view 304*a* present in the current UI view hierarchy 304. Further, the method 500 includes identifying a change in the pre-defined property of the view upon comparison. The method 500 includes categorizing the event as the UI updating event 110 in response to identifying difference in the pre-defined property and categorizing the event as the non-UI updating event 114 in response to not identifying the difference in the pre-defined property.

At step 508, the method 500 may include generating the execution flow 402 based on the categorization. The execution flow is indicative of prioritizing the UI updating event 110 for execution before the non-UI updating event 114 such that prioritization prevents or reduces a chance of the mismatch of the UI components during the launch of the application 106. "Based on" as used herein covers based at least on.

At step 510, the method 500 may include storing the execution flow 402.

At step 512, the method 500 may include executing the stored execution flow 402 during the subsequent launch of the application 106, such that launching of the application 106 is enhanced as the UI updating event 110 is executed before the non-UI updating event 114.

The method 500 may include, determining a group of the UI updating event 110 in the execution flow 402 upon categorization. The method 500 may include, determining a group of the non-UI updating event 114 in the execution flow 402 upon categorization. Further, executing the group of the UI updating event 110 before the group of the non-UI updating event 114. In an example, executing includes rendering the events on the UI of the UE 102. Further, the method 500 may include identifying presence of the non-UI updating event 114 in the group of the UI updating event 110. The method 500 includes discontinuing execution of the group of the UI updating event 110 upon identifying presence of the non-UI updating event 114, such that the visual mismatch is prevented or reduced during the launch of the application 106. Thereafter, the method 500 may include re-categorizing of the event into one of the UI updating event 110 and the non-UI updating event 114 such that none of the non-UI updating event 114 are present in the execution flow 402 before the draw finishes for the UI updating event 110.

Each embodiment herein may be used in combination with any other embodiment(s) described herein.

Certain example embodiment(s) provides various advantages:

Certain example embodiment(s) improves the device rendering performance by scheduling the drawing of user interface components immediately after the application has been launched.

Certain example embodiment(s) provides a mechanism to determine application which may require boosting so that a UI mismatch is prevented or reduced.

Certain example embodiment(s) improves the user experience of interacting with the application.

Thus, with certain example embodiment(s) the application developers may load the applications with loading screens, HD graphics and customizations.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from an example embodiment may be added to another embodiment. For example, orders of processes described herein may be changed and are not limited to the manner described herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An artificial intelligence (AI) based method to enhance launching of at least one application at a user equipment (UE), the method comprising:

monitoring a launch of the at least one application on the UE, wherein the launch comprises loading a plurality of user interface (UI) components on a user interface (UI) of the UE;

determining a plurality of events to be executed based on the launch of the at least one application;

categorizing each of the plurality of events into at least one UI updating event and/or at least one non-UI updating event for the at least one application;

generating an execution flow based on the categorization, wherein the execution flow is indicative of prioritizing the at least one UI updating event for execution before the at least one non-UI updating event such that prioritization reduces a chance of a mismatch of the plurality of UI components during the launch;

storing the execution flow; and executing the stored execution flow during a subsequent launch of the at least one application.

2. The method as claimed in claim 1, wherein categorizing each of the plurality of events into the at least one UI updating event and/or the at least one non-UI updating event is based on determining absence of a pre-defined UI updating process in the at least one application.

3. The method as claimed in claim 1, wherein categorizing the plurality of events into the at least one UI updating event and/or the at least one non-UI updating event comprises:

capturing a UI view hierarchy at the launch of the application at the UE, wherein the UI view hierarchy includes a hierarchy of a plurality of views and view-groups nodes;

capturing a current UI view hierarchy at an execution of the at least one application at the UE;

comparing the UI view hierarchy with the current UI view hierarchy;

categorizing the plurality of events as the at least one UI updating event upon comparison that the UI view hierarchy differs from the current UI view hierarchy; and categorizing the plurality of events as the at least one non-UI updating event upon comparison that the UI view hierarchy is similar to the current UI view hierarchy.

4. The method as claimed in claim 3, wherein comparing the UI view hierarchy and the current UI view hierarchy comprises:

comparing a plurality of views present in the UI view hierarchy with the plurality of views present in the current UI view hierarchy;

identifying a change in a pre-defined property of each of the plurality of views upon comparison;

categorizing the plurality of events as the at least one UI updating event in response to identifying difference in the pre-defined property; and categorizing the plurality of events as the at least one non-UI updating event in response to not identifying the difference in the pre-defined property.

5. The method as claimed in claim 3, wherein comparing the UI view hierarchy and the current UI view hierarchy comprises:

comparing a plurality of views present in the UI view hierarchy with the plurality of views present in the current UI view hierarchy;

identifying a change in a pre-defined property of each of the plurality of views upon comparison;

categorizing the plurality of events as the at least one UI updating event in response to identifying difference in the pre-defined property; and categorizing the plurality of events as the at least one non-UI updating event in response to not identifying the difference in the pre-defined property.

6. The method as claimed in claim 1, further comprising:

determining a group of the UI updating event in the execution flow upon categorization;

determining a group of the non-UI updating event in the execution flow upon categorization;

executing the group of the UI updating event before the group of the non-UI updating event, wherein executing includes rendering the plurality of events on the UI of the UE.

7. The method as claimed in claim 6, comprising:

identifying presence of the at least one non-UI updating event in the group of the UI updating event;

discontinuing execution of the group of the UI updating event upon identifying presence of the at least one non-UI updating event, such that a visual mismatch can be prevented or reduced during the launch of the application; and re-categorizing each of the plurality of events into one of the UI updating event and the non-UI updating event.

8. An artificial intelligence (AI) based system to enhance launching of at least one application at a user equipment (UE), the system comprises:
a launching module, comprising circuitry, configured to:
monitor a launch of the at least one application on the UE; wherein the launch comprises loading a plurality of user interface (UI) components on a user interface (UI) of the UE; and
determine a plurality of events to be executed based on the launch of the at least one application;
a categorization module, comprising circuitry, configured to:
categorize each of the plurality of events into at least one UI updating event and/or at least one non-UI updating event for the at least one application;
generate an execution flow based on the categorization, wherein the execution flow is indicative of prioritizing the at least one UI updating event for execution before the at least one non-UI updating event;
store the execution flow; and
an executing module, comprising circuitry, configured to:
execute the stored execution flow during a subsequent launch of the at least one application.

9. The system as claimed in claim 8, wherein the categorization module is configured to: categorize each of the plurality of events into one of the at least one UI updating event and the at least one non-UI updating event based on determining absence of a pre-defined UI updating process in the at least one application.

10. The system as claimed in claim 8, wherein the categorization module is configured to:
capture a UI view hierarchy at the launch of the application at the UE, wherein the UI view hierarchy includes a hierarchy of a plurality of views and view-groups nodes;
capture a current UI view hierarchy at an execution of the at least one application at the UE;
compare the UI view hierarchy with the current UI view hierarchy (304);
categorize the plurality of events as the at least one UI updating event upon comparison that the UI view hierarchy differs from the current UI view hierarchy; and
categorize the plurality of events as the at least one non-UI updating event upon comparison that the UI view hierarchy is similar to the current UI view hierarchy.

11. The system as claimed in claim 10, wherein the plurality of views indicates a Graphical User Interface (GUI) elements for performing the plurality of events when a user interacts with the UI of the at least one application.

12. The system as claimed in claim 10, wherein the categorization module is configured to:
compare a plurality of views present in the UI view hierarchy with the plurality of views present in the current UI view hierarchy;
identify a change in a pre-defined property of each of the plurality of views upon comparison;
categorize the plurality of events as the at least one UI updating event in response to identifying difference in the pre-defined property; and
categorize the plurality of events as the at least one non-UI updating event in response to not identifying the difference in the pre-defined property.

13. The system as claimed in claim 8, wherein the executing module is configured to:
determine a group of the UI updating event in the execution flow upon categorization;
determine a group of the non-UI updating event in the execution flow upon categorization; and
execute the group of the UI updating event before the group of the non-UI updating event, wherein executing includes rendering the plurality of events on the UI of the UE.

14. The system as claimed in claim 13, wherein:
the executing module is configured to:
identify presence of the at least one non-UI updating event in the group of the UI updating event; and
discontinue execution of the group of the UI updating event upon identifying presence of the at least one non-UI updating event, such that a visual mismatch can be prevented or reduced during the launch of the application; and
wherein the categorization module is configured to re-categorize each of the plurality of events into one of the UI updating event and the non-UI updating event.

* * * * *